(12) United States Patent
Cui et al.

(10) Patent No.: US 10,149,308 B2
(45) Date of Patent: Dec. 4, 2018

(54) COMMUNICATION QUALITY DETERMINATION/ACQUISITION DEVICE AND METHOD IN WIRELESS COMMUNICATION SYSTEM

(71) Applicant: SONY CORPORATION, Tokyo (JP)

(72) Inventors: Qimei Cui, Beijing (CN); Ting Fu, Beijing (CN); Mingliang Tao, Beijing (CN); Liang Zeng, Beijing (CN)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 14/901,623

(22) PCT Filed: Aug. 15, 2014

(86) PCT No.: PCT/CN2014/084547
§ 371 (c)(1),
(2) Date: Dec. 28, 2015

(87) PCT Pub. No.: WO2015/021945
PCT Pub. Date: Feb. 19, 2015

(65) Prior Publication Data
US 2016/0374099 A1     Dec. 22, 2016

(30) Foreign Application Priority Data
Aug. 16, 2013  (CN) .......................... 2013 1 0359535

(51) Int. Cl.
*H04W 72/08* (2009.01)
*H04W 24/10* (2009.01)
(Continued)

(52) U.S. Cl.
CPC ......... *H04W 72/085* (2013.01); *H04L 5/0032* (2013.01); *H04L 5/0057* (2013.01);
(Continued)

(58) Field of Classification Search
CPC ........... H04W 72/042; H04W 72/0446; H04W 72/0413; H04W 72/0406; H04W 72/04;
(Continued)

(56) References Cited

U.S. PATENT DOCUMENTS

2011/0250919 A1* 10/2011 Barbieri ................ H04L 1/0026
455/509
2013/0194980 A1* 8/2013 Yin ........................ H04L 1/1854
370/280

(Continued)

FOREIGN PATENT DOCUMENTS

| CN | 102025411 A | 4/2011 |
|---|---|---|
| CN | 102281638 A | 12/2011 |
| CN | 103200577 A | 7/2013 |

OTHER PUBLICATIONS

International Search Report dated Nov. 19, 2014 for PCT/CN2014/084547 filed on Aug. 15, 2014.

*Primary Examiner* — Peter Chen
(74) *Attorney, Agent, or Firm* — Xsensus, LLP

(57) ABSTRACT

A communication quality determination/acquisition device and method for a wireless communication system. The determination device includes: a measuring module configured to perform downlink channel quality measurement based on a distribution of static and dynamic downlink subframes of a target cell, wherein the static downlink subframes are downlink subframes relative to the target cell and at least one neighboring cell, while the dynamic downlink subframes are downlink subframes relative to the target cell and are uplink subframes relative to the at least one neighboring cell; and a communication module configured to report a downlink channel quality measurement result. By performing measurement and reporting while considering downlink subframe configurations and the distribution of the static and dynamic downlink subframes of the target cell, the (Continued)

device and method can accurately measure the channel quality under dynamic TDD UL/DL configurations and report the same to a network side.

17 Claims, 5 Drawing Sheets

(51) Int. Cl.
  *H04W 72/04* (2009.01)
  *H04L 5/00* (2006.01)
  *H04L 5/14* (2006.01)
(52) U.S. Cl.
  CPC ............... *H04L 5/14* (2013.01); *H04W 24/10* (2013.01); *H04W 72/0413* (2013.01)
(58) Field of Classification Search
  CPC ......... H04W 72/0453; H04W 72/1289; H04W 72/082; H04W 72/12; H04W 72/14; H04W 72/085; H04W 72/1268; H04W 72/1284; H04W 72/1278; H04W 72/1273; H04W 88/02; H04W 24/10; H04W 84/045; H04W 52/244; H04L 5/00; H04L 5/001; H04L 5/003; H04L 5/005; H04L 5/0048; H04L 5/0007; H04L 5/0057; H04L 5/0032; H04L 5/0035; H04L 5/0073; H04L 5/14
  See application file for complete search history.

(56) References Cited

U.S. PATENT DOCUMENTS

| | | | |
|---|---|---|---|
| 2013/0272170 A1* | 10/2013 | Chatterjee | H04W 28/02 370/280 |
| 2014/0092785 A1* | 4/2014 | Song | H04L 1/00 370/280 |
| 2014/0119261 A1* | 5/2014 | Wang | H04W 72/04 370/312 |
| 2016/0197687 A1* | 7/2016 | Song | H04L 5/00 370/252 |

* cited by examiner

COMMUNICATION QUALITY DETERMINATION/ACQUISITION DEVICE AND METHOD IN WIRELESS COMMUNICATION SYSTEM

TECHNICAL FIELD

The present invention relates to communication field, and particularly to a communication quality determination device and method and a communication quality acquisition device and method in a wireless communication system.

BACKGROUND ART

A Long Term Evolution (LTE) system supports two duplex modes, namely, Frequency Division Duplex (FDD) and Time Division Duplex (TDD). Compared with FDD, TDD does not need paired frequency spectrum resources, thereby providing more flexible system configurations. Currently, with regard to each frame containing 10 subframes, TDD-LTE can provide 7 different subframe configurations for uplink and downlink distributed asymmetrically. As shown in the following Table 1, these subframe configurations can provide 40%-90% downlink subframes, presenting flexible service adaptability characteristics. In particular, D in Table 1 represents a downlink subframe, U an uplink subframe, and S a special subframe. A special subframe consists of a downlink Orthogonal Frequency Division Multiplexing (OFDM) symbol, a blank protective interval and an uplink OFDM symbol, wherein the downlink OFDM symbol accounts for a large proportion and is used for transmitting control information and data information. Therefore, usually a special subframe is approximated as a downlink subframe.

TABLE 1

| Uplink and downlink configurations | Switching period of uplink and downlink | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In an existing mobile communication system, all cells of a network will be statically set with the same TDD Uplink/Downlink (UL/DL) configuration to reduce inter-cell interference and management complexity. When a homogeneous network is covered by a macro base station, since a large number of subscribers are served by the macro base station, the statistical rules of the covered area are stable and consistent, thus it is suitable to use the method for statically setting all the cells of the network with the same uplink and downlink subframe configuration. However, with development of wireless communication, low power access points, such as micro base stations, pico base stations, household base stations, and radio remote units etc., are introduced on a large scale. In this case, since fewer subscribers are served by low power access points, and most of them are covered by hot points, dynamic changes of uplink and downlink service amounts of the areas covered by low power access points are remarkable, and obvious difference exists in the uplink and downlink service amounts among different low power access points. Therefore, it is necessary for each cell to dynamically perform TDD UL/DL configuration.

In the case of dynamically configuring TDD UL/DL, different cells will dynamically select suitable subframe configurations based on condition of their service amounts, requiring greater flexibility and adaptability. However, in another aspect, as adjacent cells select different uplink and downlink subframe configurations, cross interference between uplink and downlink subframes among different cells, that is, inter-base station interference and inter-user interference will be introduced. For example, with regard to one TDD subframe, it may be a downlink subframe for Cell 1 and an uplink subframe for Cell 2; the base stations for Cell 1 and Cell 2 may cause inter-base station interference (such as the BS-BS interference shown in FIG. 1), and the user equipment (UE) in Cell 2 and Cell 1 may cause inter-UE interference (such as the UE-UE interference shown in FIG. 1).

In a statically configured TDD network, since the TDD UL/DL configuration for each cell is the same, in the respective downlink subframes, interference to the receiving terminal, that is, the UE comes from the downlink transmission power of the BSs in other cells, and is relatively stable, therefore, a channel quality indicator (CQI) value may be measured and reported within a certain CQI reporting period (the periods for reporting channel quality information in TD-LTE include 1 ms, 5 ms, 10 ms, 20 ms, 40 ms, 80 ms and 160 ms), to assess the channel conditions of all downlink subframes in one frame (the CQI measurement process is as below in the prior arts: in a certain CQI reporting period, one subframe is selected to perform CQI measurement and reports a CQI value within a designated reporting period; a time point for a user to report CQI is configured by high level signaling at the BS side). But in a dynamically configured TDD network, interference of a static downlink subframe in a target cell basically comes from the downlink transmission power of the BSs of other cells, while interference of a dynamic downlink subframe may come from the downlink transmission power of the BSs in other cells or the uplink transmission power of the users in other cells. Therefore, for dynamic TDD configurations, interference conditions of the respective downlink subframes may differ greatly, so the traditional CQI measuring and reporting manner cannot reflect the changes of the interference conditions of the respective downlink subframes in the dynamic TDD configurations, causing reduced system performance.

At present, in case of dynamic TDD UL/DL configurations, there is no effective solution to the problem that an effective CQI measuring and reporting cannot be performed in the prior arts.

SUMMARY OF THE INVENTION

Regarding the problem that effective CQI measuring and reporting cannot be performed in dynamic TDD UL/DL configurations in the prior arts, the present invention proposes a communication quality determination device and method and a communication quality acquisition device and method for a wireless communication system, which are capable of measuring the channel quality in dynamic TDD UL/DL configurations so that the measurement results can reflect the interference conditions of dynamically configured subframes.

To realize the above objective, according to one aspect of the present invention, a communication quality determination device for a wireless communication system is provided, the device comprising:

- a measuring module configured to perform downlink channel quality measurement based on a distribution of static and dynamic downlink subframes of a target cell, wherein the static downlink subframes are downlink subframes relative to the target cell and at least one neighboring cell, while the dynamic downlink subframes are downlink subframes relative to the target cell and are uplink subframes relative to the at least one neighboring cell; and
- a communication module configured to report a downlink channel quality measurement result.

According to an another aspect of the present invention, a communication quality determination method for a wireless communication system is provided, the method comprising: performing downlink channel quality measurement based on a distribution of static and dynamic downlink subframes of a target cell, wherein the static downlink subframes are downlink subframes relative to the target cell and at least one neighboring cell, while the dynamic downlink subframes are downlink subframes relative to the target cell and are uplink subframes relative to the at least one neighboring cell; and reporting a downlink channel quality measurement result.

According to an another aspect of the present invention, a communication quality acquisition device for a wireless communication system is provided, the device comprising:

- a determination module configured to determine a distribution of static and dynamic downlink subframes of downlink subframes of a target cell based on uplink/downlink subframe configurations of the target cell and at least one neighboring cell; and a communication module configured to transmit the distribution of the static and dynamic downlink subframes to user equipment of the target cell, and to receive a downlink channel quality measurement result measured and reported by the user equipment based on the distribution of the static and dynamic downlink subframes.

According to an another aspect of the present invention, a communication quality acquisition method for a wireless communication system is provided, the method comprising:

determining a distribution of static and dynamic downlink subframes of downlink subframes of a target cell based on uplink/downlink subframe configurations of the target cell and at least one neighboring cell; and transmitting the distribution of the static and dynamic downlink subframes to user equipment of the target cell, and receiving a downlink channel quality measurement result measured and reported by the user equipment based on the distribution of the static and dynamic downlink subframes.

According to an another aspect of the present invention, a communication quality determination device for a wireless communication system is provided, the device comprising:

- a grouping module configured to group downlink subframes of the target cell to obtain at least one downlink subframe set; and a measuring module configured to perform downlink channel quality measurement for the respective downlink subframe set respectively.

According to an another aspect of the present invention, a communication quality acquisition device for a wireless communication system is provided, the device comprising:

- a grouping module configured to group downlink subframes of a target cell to obtain at least one downlink subframe set; and
- a communication module configured to transmit information of the at least one downlink subframe set to user equipment of the target cell and receive a downlink channel quality measurement result of the respective downlink subframe set from the user equipment.

By performing measurement and reporting while considering the downlink subframe configurations based on the distribution of the static and dynamic downlink subframes of the target cell, the present invention can accurately measure the channel quality under dynamic TDD UL/DL configurations and report the same to the network side, avoiding the problem in the prior arts that reporting the downlink channel quality cannot enable the network side to know the actual communication quality of each downlink subframe under dynamic TDD UL/DL configurations.

BRIEF DESCRIPTION OF THE DRAWINGS

To describe the technical solutions of the embodiments of this invention or the prior arts clearly, the drawings required for the embodiments of this invention are briefly introduced. Obviously, the drawings described below only show some embodiments of this invention, and other drawings may be obtained based thereon by those skilled in the art without any inventive work.

DETAILED DESCRIPTION

Figure 1:
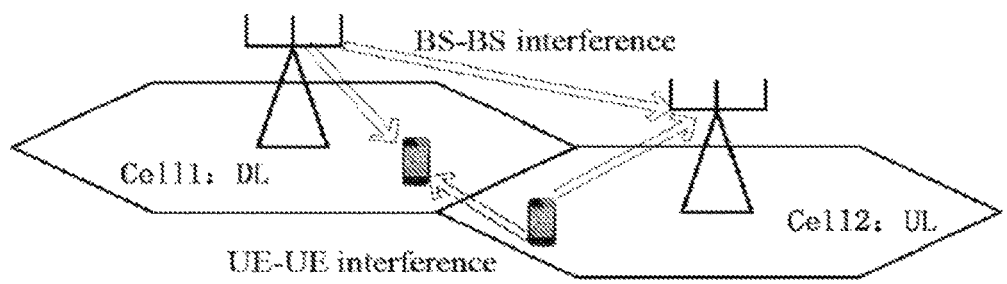
FIG. 1 is a schematic drawing showing cross interference of subframes in a dynamic TDD system of the related arts.

The exemplary embodiments of this invention will be described below with reference to the drawings. To make it clear and brief, all the features of actual embodiments are not described in the description. However, it should be understood that various decisions specific to the embodiments must be made in developing any such embodiment to realize the specific targets of development personnel, for example, necessary restricting conditions related to the system and services may be satisfied, and such restricting conditions may differ depending on different embodiments.

It should also be understood that although development may be complex and time-consuming, such work is a routine task for those skilled in the art which profit from the disclosure of this application.

In addition, it should be explained that, to avoid obscuring this invention due to unnecessary details, only the device structures and/or processing steps closely related to the solutions of this invention are shown in the drawings, while other details not closely related thereto are omitted.

Figure 2:
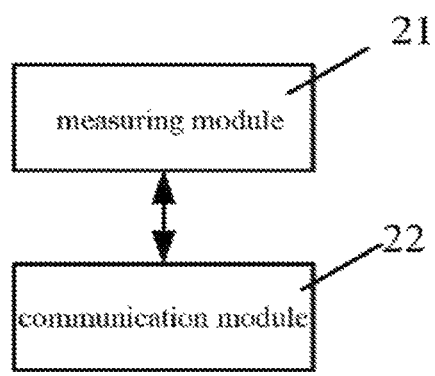
FIG. 2 is a block diagram of a communication quality determination device for a wireless communication system according to an embodiment of this invention.

FIG. 2 shows a communication quality determination device for a wireless communication system according to an embodiment of this invention.

As shown in FIG. 2, the communication quality determination device for a wireless communication system according to an embodiment of this invention comprises:

a measuring module 21 configured to perform downlink channel quality measurement based on the distribution of the static and dynamic downlink subframes of a target cell, wherein the static downlink subframe is a downlink subframe relative to the target cell and a neighboring cell, while the dynamic downlink subframe is a downlink subframe relative to the target cell and is a uplink subframe relative to at least one neighboring cell; and a communication module 22 configured to report a measurement result of downlink channel quality.

The neighboring cell mentioned here may be a cell adjacent to position of the target cell, or a cell with relatively strong interference already determined by measurements in advance or a cell previously designated by the system.

Alternatively, in an embodiment, the measuring module 21 can determine a number of dynamic downlink subframes of the target cell in advance. If the number of dynamic downlink subframes exceeds a predetermined threshold, it means that there is a large number of downlink subframes possibly subjected to interference in the target cell. In this case, the measuring module 21 performs downlink channel quality measurement for the static and dynamic downlink subframes respectively; if the number of dynamic downlink subframes does not reach the predetermined threshold, it means that few or none of the downlink subframes of the target cell will be interfered. In this case, any downlink subframe may be measured to obtain measurement results representing the channel quality of all downlink subframes. For example, one CQI value may be obtained through measurements. In addition, except for determining whether to perform downlink channel quality measurement to the static and dynamic downlink subframes respectively based on the number of dynamic downlink subframes, whether to perform downlink channel quality measurement to the static and dynamic downlink subframes respectively may be determined based on a proportion of dynamic downlink subframes in the downlink subframes, a proportion of dynamic downlink subframes to static downlink subframes or a numerical relation between static and dynamic downlink subframes. At this time, if a proportion of dynamic downlink subframes in all the subframes of the target cell is relatively small (for example, being less than a threshold proportion), or the number of dynamic downlink subframes and static downlink subframes is relatively small (for example, being less than a threshold proportion), or the number of dynamic downlink subframes is less than that of static downlink subframes and the absolute value of the difference therebetween is greater than a threshold, any downlink subframe may be measured to obtain measurement results representing the channel quality of all downlink subframes. For example, a CQI value may be obtained through measurements. Therefore, in this embodiment, the distribution of the static and dynamic downlink subframes is determined by the number of dynamic/static downlink subframes, proportions of static and dynamic downlink subframes in all the subframes, or a numerical relation between static and dynamic downlink subframes, depending on the different distribution of the static and dynamic downlink subframes, any downlink subframe may be measured or static and dynamic downlink subframes may be measured respectively.

In one embodiment, the communication quality determination device may be provided at the terminal side, and the terminal may, via the communication module 22, receive static and dynamic downlink subframe information of the target cell informed by a base station. The static and dynamic downlink subframe information may be the IDs of respective subframes and the corresponding static/dynamic marking positions, or the ID of a group of downlink subframes and the corresponding static/dynamic marking position of the group, or only the IDs of all dynamic downlink subframes (since the terminal can know the static downlink subframes based on the current uplink and downlink subframe configuration and all dynamic downlink subframes).

In one embodiment, the device according to an embodiment of the present invention may further comprise a grouping module (not showed) configured to group the downlink subframes of the target cell to obtain a group containing static downlink subframes and a group containing dynamic downlink subframes. Therefore, in this embodiment, the grouping module can group all the downlink subframes of the target cell in the current uplink and downlink configuration into two groups. Since interference of static and dynamic downlink subframes differ greatly, compared with the solution in the traditional arts of measuring all the downlink subframes and reporting a single CQI value, this embodiment measures the downlink subframes within each group respectively; therefore, the obtained measurement results (for example, CQI) can reflect the channel quality of the subframes of each group more accurately, facilitating followed processing by the network side.

In one embodiment, the grouping module may be provided at the network side. Since the base station of the target cell can communicate with the base stations of neighboring cells and acquire the uplink/downlink subframe configurations of the target cell and the neighboring cells, the grouping module can group the subframes based on the acquired uplink/downlink subframe configurations of the target cell and the neighboring cells. In another embodiment, the grouping module may be provided at the terminal side. Since the communication module 22 can receive static and dynamic downlink subframes information of the target cell, the grouping module can perform grouping based on the received static and dynamic downlink subframe information.

In another embodiment, the grouping module can not only group the downlink subframes into a group containing static downlink subframes and a group containing dynamic downlink subframes, but further group the groups containing dynamic downlink subframes based on the number of interference subframes of each dynamic downlink subframe, wherein the interference subframe is an uplink interference subframe of other cells. For example, referring to schematic diagram showing the static/dynamic subframe configurations in FIG. 3, the UL/DL configuration used by the cell Pico 3 is Config #5. The cell Pico 3 is taken as the target cell. Under the configuration shown by FIG. 3, the 0-th, fourth to sixth and the ninth subframes are static downlink subframes.

The second subframe, which is a special subframe, is also regarded as a static downlink subframe, so static downlink subframes can be grouped into a first group. The third, sixth and eighth subframes are dynamic downlink subframes, and can be grouped into a second group. For the fourth subframe, the interference subframes include three interference subframes, namely, the subframes of the cell macrocell 1, cell Pico 1 and cell Pico 5. For the sixth and eights subframes, the interference subframes include two interference subframes, namely, the subframes of the cell Pico 1 and cell Pico 5. Therefore, the third subframe can be grouped into a third group. As such, the grouping of dynamic downlink subframes is more accurate, which facilitates measurement of dynamic downlink subframes with different number of interferences respectively and improves accuracy of the measurement results. In one embodiment, when measuring the respective groups, if the measurement results of multiple groups among a predetermined number of frames (the predetermined number can be pre-set as one or more, for example) are very close or even identical, the multiple groups can be combined. Then, measurement and reporting can be performed to the combined group to save measurement and reporting resources.

Figure 3:
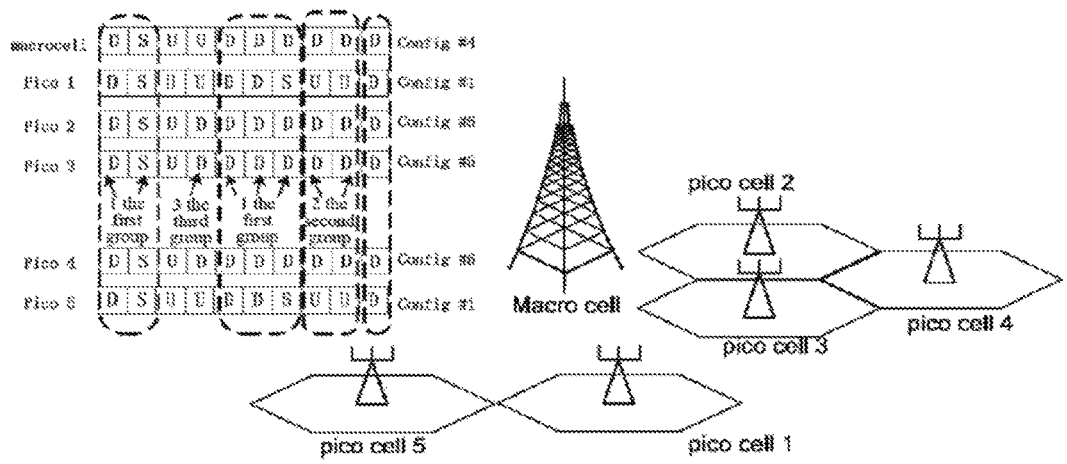
FIG. 3 is a schematic drawing showing the grouping of subframes in a communication quality determination method for a wireless communication system according to an embodiment of this invention.

It should be noted that FIG. 3 shows an example of grouping the subframes according the present embodiment, and thereafter, a different grouping method is used when grouping the downlink subframes with the cell macrocell as the target cell. Therefore, the grouping result of the downlink subframes of the cell macrocell is not related with the grouping result for the cell Pico 3 shown in FIG. 3.

In another embodiment of this invention, measurement may be performed to the static and dynamic downlink subframes respectively in advance; then, the static and dynamic downlink subframes are grouped based on the similarity between the measurement results. The subframes having close measurement results (a CQI grade, for example) are grouped into one group. In a reconfiguring period, one or more starting frames may be measured, and the subframes having close measurement results are grouped into one group. After that, for the remaining frames during the reconfiguring period, measurement and reporting may be performed for the subframes of each group based on the grouping result respectively. If measurement is performed for multiple frames (for example, $M_1$ frames are selected, wherein $M_1$ is not less than 2 and less than a number of all the frames in a reconfiguring period; for example, $M_1$ may be 2 or 3 or other values), multiple results will be obtained for each measured subframe, when determining the similarity between the measurement results, the multiple results for a subframe may be averaged (including weighted averaging) to obtain a measurement result of the subframe. In one embodiment, when measuring the subframe groups of other frames after $M_1$ frames, if the measurement results of multiple groups among a predetermined number of frames (the predetermined number can be pre-set as one or more, for example) are very close or even identical, the multiple groups can be combined, measurement and reporting can be performed to the combined group.

Further, in a reconfiguring period, the subframes may be grouped by measuring the $M_1$ frames for several times, that is, the subframes may be grouped for several times in one reconfiguring period (to group subframe sets having equal channel quality). Specifically, the subframes may be grouped by measuring the starting $M_1$ frames in one reconfiguring period to obtain subframe sets of equal channel quality. Measurement and reporting can be performed to each group for $M_2$ frames following $M_1$ frames based on the grouping result. The downlink subframes may be grouped again for $M_3$ frames following $M_2$ frames using the above measurement method to obtain newly grouped subframe sets of equal channel quality. Measurement and reporting can be performed to each set for $M_4$ frames following $M_3$ frames based on the newly grouped subframe sets of equal channel quality. In one embodiment, $M_1$ to $M_4$ may be equal each other. In another embodiment, $M_1$ equals to $M_3$, and $M_2$ equals to $M_4$, but $M_1$ does not equal to $M_2$. In other embodiments, the values of $M_1$ to $M_4$ may be set according to the actual needs. In addition, in one reconfiguring period, grouping may be performed again for twice or more (to group subframe sets having equal channel quality).

In the embodiment in which the subframes are grouped to obtain subframe sets having equal channel quality, the measuring module 21 may be further configured to perform, among a predetermined number of frames, measurement for each dynamic downlink subframe of each frame, and measurement for at least one static downlink subframe of each frame in advance. In addition, the communication quality determination device according to the embodiments of the present invention may further comprise a calculating module configured to average multiple measurement results of each measured subframe among the multiple frames to obtain a measurement result of each measured dynamic downlink subframe and a measurement result of the static downlink subframe. In this embodiment, the communication quality determination device may also include a grouping module. Different from the previous embodiments described, the grouping module in this embodiment is configured to group the subframes whose measurement result difference falls into a predetermined range into one group.

In this embodiment, since the subframes grouped in one group have close or identical channel quality, the subframe groups in this embodiment may also be called subframe sets of equal channel quality.

In addition, grouping of downlink subframes of the target cell may be determined through other means; for example, it may be determined by the base station side and informed to the terminal side.

No matter how the downlink subframes are grouped, when measuring the grouped downlink subframes, the measuring module 21 can measure the downlink channel quality of at least one downlink subframe in each group to obtain a downlink channel quality measurement result of the group. In addition, the communication module 22 is further configured to report the downlink channel quality measurement result of at least a part of the groups, wherein the downlink channel quality measurement result of each group is obtained from a measurement value of at least one measured subframe in the group or an average measurement value of all measured subframes in the group. Since the downlink subframes are grouped in advance based on the configuration of the static and dynamic downlink subframes or the measurement result of the communication quality of multiple frames, the communication quality of all subframes in a group can be regarded as similar, therefore, the measurement result of one or more subframes in a group can be regarded as the measurement result of that group. Performing measurement for the groups of downlink subframes respectively obviously takes consideration of the problem that the interference for different subframes differs greatly under dynamic downlink subframe configurations, and is better than the traditional solution that the downlink subframes of one frame are not discriminated and only one CQI is reported.

In addition, when reporting the measurement results, the communication module 22 may report the downlink channel quality measurement results of all the groups or a part of the groups. When reporting the downlink channel quality measurement results of a part of the groups, said part of the groups subject to reporting are determined based on at least one of the following conditions: the downlink channel quality, the number of downlink subframes contained and reporting history. In one embodiment, if there are limited communication resources and it is impossible to report the downlink channel quality measurement results of all the groups to the base station, reporting of the measurement results may be performed to the groups having relatively higher downlink channel quality and/or the groups containing a large number of downlink subframes. For example, the groups having downlink channel quality grades higher than an average downlink channel quality grade of all groups may be determined as the groups subject to reporting, and the groups having downlink channel quality grades higher than a predetermined grade may be determined as the groups subject to reporting. Similarly, when determining the groups subject to reporting based on the number of downlink subframes, the groups having a number of subframes higher than an average number of subframes of all groups may be determined as the groups subject to reporting, and the groups having a number of subframes higher than a predetermined number may be determined as the groups subject to reporting. In addition, the groups having a number of dynamic downlink subframes higher than an average number or a predetermined number of dynamic downlink subframes of all groups may be determined as the groups subject to reporting. In addition, alternate reporting may be adopted for multiple groups. In this way, when reporting for each round, the downlink channel quality measurement result of one or more groups may be reported based on the sequence of the groups. In addition, random reporting may be adopted. In this case, the downlink channel quality measurement result of one or more groups may be reported randomly for each reporting. Alternatively, no matter what mode is used to report the downlink channel quality measurement result of a part of the groups, the reporting history of each group may be considered for each reporting. If the downlink channel quality measurement result of one group is not reported for more than n reporting periods, that group should be determined as a reporting target for the present reporting. For example, in case of random reporting, in addition to the groups randomly selected for reporting, the groups not reported in a predetermined time period (or for predetermined reporting times) should be determined as reporting targets. In addition, the above determination conditions for determining the reporting targets may be used in combination. For example, the group having a number of downlink subframes higher than an average number and having a downlink channel quality grade higher than a predetermined grade may be determined as the group subject to reporting. This description will not exhaustively list all the cases. By reporting the measurement results of a part of the groups, network resources can be effectively saved.

In addition, when reporting the measurement results, the subframe(s) or group(s) corresponding to the measurement results should be reported. For example, if two subframes of one group are measured, and the measurement results of the two subframes are reported, when reporting, the corresponding identification(s) of the subframes and/or the group should also be reported in addition to the measurement results of the two subframes. If one subframe of one group is measured, and the measurement result of the subframe is reported as the measurement result of the group, when reporting, the corresponding identification of the subframe and/or the identification of the group containing the subframe should also be reported in addition to the measurement result of the subframe.

If the network side knows the grouping of the subframes (the network side knows the identification of each group and the identifications of the subframes contained in each group), when reporting, only one of the subframe identifications and the group identification (or both of them) may be reported. If the network side does not know the grouping of the subframes (for example, the grouping of the subframes is changed due to combination of groups), before or when reporting the measurement result, the changed grouping of the subframes (including the identification of each group and the identifications of the subframes contained in each group) should be reported to the network side.

As shown by the above descriptions, the present invention proposes a solution of measuring and reporting CQI in a system with dynamic TDD UL/DL configurations.

The embodiment of grouping the subframes into subframe sets of equal channel quality mainly includes the following steps:

Step 1: determining the static and dynamic downlink subframes of a target cell, including Steps 1-1 and 1-2:

Step 1-1: informing, by a neighboring cell via the X2 port, its configuration to the target base station, or determining dynamic downlink subframes according to the characteristics of the 7 configurations directly by the target base station; and Step 1-2: discriminating static and dynamic downlink subframes and informing the discrimination result to user equipment by the target cell (the base station can inform the user equipment of static and dynamic downlink subframes through high level signaling, such as RRC signaling);

Step 2: in each of the starting $M_1$ frames of a reconfiguring period (to facilitate accurate grouping of the subframe sets of equal channel quality in the followed procedures, $M_1$ should not be smaller than 2 to obtain an average value and reduce error; to save CQI measurement and reporting resources, $M_1$ should be far smaller than a frame number in a reconfiguring period, for example, 2-3 frames), measuring the downlink channel quality by the user equipment of the target cell; obtaining several subframe sets of equal channel quality based on the measurement result, and performing CQI reporting for the starting $M_1$ frames according to certain rules; and Step 3: in the followed $M_2$ frames of the reconfiguring period, measuring and reporting a CQI value by the user equipment based on the acquired grouping of the subframe sets of equal channel quality. In one reconfiguring period, Steps 2-3 may be repeated for several times to adapt to changes of interference to the system.

Detailed explanations for Steps 1-3 are as below:

Step S1: when each reconfiguring period starts, the base station of the target cell groups the static and dynamic downlink subframes of the downlink subframes under the TDD UL/DL configuration of the target cell, and informs the grouping result to user equipment of the current cell. Wherein the static downlink subframe always is a downlink subframe under the TDD UL/DL configuration of BSs of the target cell and a neighboring cell, while the dynamic downlink subframe is a downlink subframe under the TDD UL/DL configuration of the BS of the target cell and is a uplink subframe relative to the BSs of some neighboring cells. Grouping of the static and dynamic downlink subframes may be performed in the following manners:

Step S1-1: according to the characteristics of 7 UL/DL configurations in TDD-LTE, downlink subframes 0, 1, 5, and 6 must be static downlink subframes. So subframes 0, 1, 5, and 6 can be grouped as static downlink subframes, while other downlink subframes as dynamic downlink subframes. Such a grouping manner does not require exchange of UL/DL configuration information among the respective cells (according to this method, the BS does not need to exchange information about static and dynamic downlink subframes with the UE, and the UE can acquires such information from previous setting). Using this manner, previously set static downlink subframes must be contained in the static downlink subframes under the actual working state. Compared with the solution of determining the static/dynamic downlink subframes of a target cell based on the UL/DL configuration of a neighboring cell, Step S1-1 saves communication resources between the BSs of the target cell and the neighboring cells and between the BSs of the target cell and the UEs.

Step S1-2: the BS of the target cell acquires the TDD UL/DL configuration of the BS of the neighboring cell. The static and dynamic downlink subframes under the TDD UL/DL configuration of the target cell are determined based on the UL/DL configuration information of the current cell and the neighboring cell. Assume the target cell has $N_1$ static downlink subframes and $N_2$ dynamic downlink subframes in one frame of the current reconfiguring period.

Step S2: in each of the starting $M_1$ frames of a reconfiguring period ($M_1$ frames are far less than a reconfiguring period), measuring of the downlink channel condition is performed by the UE of the target cell. Several subframe sets of equal channel quality are obtained based on the measurement results, and CQI reporting for the starting $M_1$ frames is performed according to certain rules. Specifically, step S2 may include the following Steps S2-1 to S2-3:

Step S2-1: in each frame, the UE randomly measures one subframe (or several static downlink subframes) out of $N_1$ static downlink subframes to obtain a CQI quantized value $CQI_{S\_i}$. The UE measures $N_2$ dynamic downlink subframes to obtain CQI quantized values $CQI_{F1\_i}$, $CQI_{F2\_i}$, . . . , $CQI_{FN_2\_i}$, $CQI_{FN_2\_i}$ ($i \in \{1, \ldots, M_1\}$) respectively.

Step S2-2: if the UE needs to report CQI information for $M_1$ frames (The phrase "needs to report" means that the UE determines the time points for reporting CQI periodically based on a period and a subframe offset value configured by the high level signaling of the BS, and reports CQI information when the time point comes), at least one of the following reporting modes may be used:

(Mode 1) One CQI value can be reported for $N_1$ static downlink subframes. The CQI value may be a weighted calculating result of the current CQI measurement value and previous CQI measurement values of the $N_1$ static downlink subframes. One CQI value can be reported for $N_2$ dynamic downlink subframes respectively. The CQI value may be a weighted calculating result of the current CQI measurement value and previous CQI measurement values of the $N_2$ dynamic downlink subframes. The weight design principles are as below: it may be simple calculation of an average; or a weighted average of multiple measurement values, wherein a greater weight is allocated to a CQI measurement value closer to the current time point; the current CQI measurement value may be considered only, so in this case, the weight factor for the current CQI measurement value is 1, and the weight factor for the previous CQI measurement values is 0. Here, the reason of using a weighted value is that a measured instantaneous CQI value may fail to reflect the average channel quality for a single CQI measurement due to uncertainties of channels and interference, but if a weighted value is used, the average channel quality can be better reflected. When reporting the CQI information, the UE needs to inform the BS of the current cell of the correspondence relation between the CQI value and the subframes. An detailed example of the format for the reported CQI is as below: as shown in FIG. 3, assume the target cell is the cell macrocell, the target cell currently uses the downlink subframe configuration of config #4, and the configurations of neighboring cells are Config #1, #5, #5, #5 and #1; in this case, the static downlink subframes of the current cell under the current configuration include subframes 0, 1, 4, 5, 6 and 9, and the dynamic downlink subframes include subframes 7 and 8.

If the UE needs to report CQI information for $M_1$ frames, the format of the reported CQI may adopt the following form—a CQI value plus corresponding subframe identifications:

CQI1 (subframes 0, 1, 4, 5, 6 and 9); and
CQI2 (subframes 7 and 8).

The CQI value reflects ratio of a signal to sum of interference and noise of a channel, i.e., $$CQI = \frac{S}{I+N},$$

wherein S is the signal receiving power, I is the interference power and N is the following three noise power. When calculating the average CQI value of $M_1$, frames, the methods may be adopted:

$$CQI_{aver} = \frac{1}{M_1} \sum_{i=1}^{M_1} \frac{S_i}{I_i + N}; \tag{1}$$

$$CQI_{aver} = \frac{1/M_1 \sum_{i=1}^{M_1} S_i}{1/M_1 \sum_{i=1}^{M_1} I_i + N}; \text{ and} \tag{2}$$

$$CQI_{aver} = \frac{1}{M_1} \sum_{i=1}^{M_1} \frac{S_i}{1/M_1 \sum_{i=1}^{M_1} I_i + N}. \tag{3}$$

The symbol i represents the measured subframes of an i-th frame of multiple frames, $M_1$ is a total number of the multiple frames, $CQI_{aver}$ represents an average of multiple measurement values of the measured subframes, $S_i$ represents the signal receiving power of the measured subframes of the i-th frame of multiple frames, $I_i$ represents the interference power of the measured subframes of the i-th frame of multiple frames, N represents the noise power, and $S_i/I_i$ represents the signal strength/interference strength measured in the i-th frame.

(Mode 2) One weighted CQI value can be reported for $N_1$ static downlink subframes. The CQI value may be a weighted calculating result of the current CQI measurement value and previous CQI measurement values of the $N_1$ static downlink subframes. One weighted CQI value can be reported for $N_2$ dynamic downlink subframes, wherein the CQI value may be a weighted calculating result of the current CQI measurement value and previous CQI measurement values of the all dynamic downlink subframes. When reporting the CQI information, the UE needs to inform the BS of the current cell of the correspondence relation between the CQI value and the respective subframes. The reporting form may refer to the form in Mode 1: a CQI value plus corresponding subframe identifications (in the followed processing, since subframe sets of equal channel quality will be determined by grouping, and all or a part of the dynamic downlink subframes may be grouped into certain set, reporting for the $N_2$ dynamic downlink subframes will be changed from separate reporting to reporting in the unit of set).

(Mode 3) Based on Mode 2 above, the subframes having the same or similar weighted CQI quantized value(s) are grouped into a temporary subframe sets of equal channel quality (grouping of the sets may be performed by the UE). A CQI value is reported for a subframe in each temporary subframe set of equal channel quality, wherein the CQI value may be a weighted calculating result of the current CQI measurement value and previous CQI measurement values of all the subframes of the temporary subframe set of equal channel quality. When reporting the CQI information, the UE needs to inform the BS of the current cell of the correspondence relation between the CQI value and the respective subframes.

Step S2-3: by averaging the CQI values for the starting $M_1$ frames by the UE, an average CQI value for all the $N_1$ static downlink subframes and the respective dynamic downlink subframes is obtained. The UE may group the subframes having the same or similar average CQI quantized value(s) (for example, there are 5 CQI grades, namely, grades 1-5; the difference may not exceed 1-2 grade(s)) into the same subframe set of equal channel quality.

$$CQI_S=\text{average } (CQI_{S\_i}, i\in\{1,\ldots,M_1\}),$$

$$CQI_{Fj}=\text{average}(CQI_{Fj\_i}, i\in\{1,\ldots,M_1\}), j\in \{1,\ldots,N_2\}. \quad \text{Equation (1)}$$

Before grouping the subframes into subframe sets of equal channel quality, an averaged measurement result $CQI_S$ for the static downlink subframes in $M_1$ frames can be determined based on Equation (1). In addition, an averaged measurement result $CQI_{Fj}$ for each dynamic downlink subframe in $M_1$ frames can be determined based on Equation (1), wherein j represents a j-th dynamic downlink subframe of the i-th frame in $M_1$ frames.

Step S3: in the followed $M_2$ frames (optionally, the values of $M_1$ and $M_2$ should meet a condition that a frame number in one reconfiguring period should be exactly divided by $M_1+M_2$), the UE measures and reports the CQI values according to the obtained grouping of subframe sets of equal channel quality. Step S3 specifically includes Steps S3-1 to S3-4.

Step S3-1: when measuring the downlink channel quality, the UE may randomly select one subframe (or several subframes) from all the subframes of a subframe set of equal channel quality to perform CQI measurement, and regard the measurement value as the CQI value for the subframe set of equal channel quality.

Step S3-2: when reporting the CQI information to the BS, the UE only needs to report one CQI value for each subframe set of equal channel quality (if the subframe set of equal channel quality is selected).

Step S3-3: for each subframe set of equal channel quality, the CQI value reported by the UE may be a weighted calculating result of the current CQI measurement value and previous CQI measurement values of the subframe set of equal channel quality.

Step S3-4: when reporting the CQI information for $M_2$ frames at least for the first time, the UE needs to inform the BS of the current cell of the correspondence relation between the CQI value and the respective subframes (the correspondence relation between the CQI value and the respective subframes may be informed in each reporting, optionally, such informing may be performed in the first reporting to save resources, if subframe sets of equal channel quality are combined in the followed processing, the correspondence relation between the CQI value and the respective subframes may be informed to the BS of the current cell in the first reporting after the combination).

Steps S2 and S3 may be repeated for several times in one reconfiguring period, so that when system interference is changed substantially in a reconfiguring period, the UE can adaptively adjust the grouping of the subframe sets of equal channel quality. The repeating time equals to a frame number in a reconfiguring period divided by ($M_1+M_2$). If the interference environment of the network is regarded to be stable, repeating may not be performed or reduced. If the interference environment of the network is regarded to vary greatly, repeating may be performed many times. Take a reconfiguring period of 320 ms or 32 frames as an example, the repeating times may be 0-7.

In addition, in an alternative embodiment, when the UE reports the CQI information in Steps S2-2 and S3, the priorities of the CQI values may be considered.

According to the description of Item 5.2.3.3-1 in the Table TS 36.212, the bit number of the maximum loadable pre-encoding channel information (including CQI, PMI and RI) is 13 bits; but in fact, the maximum bit number for channel information reporting under different reporting modes is 11 bits. Since the resources occupied by the CQI information carried by uplink control channels are limited, reporting resources may become insufficient when the UE reports the CQI information for different subframe sets of equal channel quality respectively, and the priorities of the CQI values should be considered.

Step S4: when the UE reports the CQI information, in case of insufficient resources, the following aspects may be considered for the CQI priorities of different subframe sets of equal channel quality:

(1) the CQI of a subframe set of equal channel quality having a higher CQI grade has a higher reporting grade, while the CQI value having a lower CQI grade will be discarded;

(2) the CQI of a subframe set of equal channel quality having a larger number of downlink subframes has a higher reporting grade, while the CQI of a subframe set of equal channel quality having a smaller number of downlink subframes will be discarded; and (3) polling may be used, and the CQI information of the respective subframe sets of equal channel quality may be reported in alternation.

The followings will take the scenario shown in FIG. 3 as an example to describe a solution of grouping the downlink subframes into subframe sets of equal channel quality.

As shown in FIG. 3, the target cell is the Macro cell. Assume the dynamic TDD system has a UL/DL reconfiguring period of 320 ms or a time length of 32 frames (the reconfiguring period is a reconfiguring period set by the dynamic TDD network, when the Macro cell maintains the same UL/DL configuration, since a neighboring small cell will dynamically configure the UL/DL configuration, the downlink subframes of the Macro cell will have different levels of interference. The grouping of dynamic/static downlink subframes for the Macro cell is also valid). In this example, the CQI measurement and reporting solution is as below:

Step S11: When each reconfiguring period starts, the BS of the Macro cell groups the static and dynamic downlink subframes in the downlink subframes of the current cell under TDD UL/DL configuration, and informs the grouping result to the UE of the current cell. Specifically, the BS of the Macro cell acquires the configurations of the BSs of neighboring cells—Config #1, #5, #5, #5 and #1, and with reference to its own configuration Config #4, divides into subframes 0, 1, 4, 5, 6 and 9 as static downlink subframes and subframes 7 and 8 as dynamic downlink subframes under the current configuration of the current cell. The grouping result includes 6 static downlink subframes and 2 dynamic downlink subframes. The static/dynamic downlink subframes are different for different cells. A static/dynamic downlink subframe means that the interference level of the subframe of the cell is static or dynamic, rather than that the subframe is changed or not.

Step S12: in each frame of the first two frames of each reconfiguring period, the UE of the target cell measures the downlink channel condition. Specifically, Step S12-1: in the first frame, the UE randomly selects the subframe 6 from the 6 static downlink subframes for measurement to obtain a CQI quantized value $CQI_{S\_1}$, and respectively measures the two dynamic downlink subframes to obtain CQI quantized values $CQI_{F1\_1}$ and $CQI_{F2\_1}$. In the second frame, the UE randomly selects the subframe 1 from the 6 static downlink subframes for measurement to obtain a CQI quantized value $CQI_{S\_2}$, and respectively measures the two dynamic downlink subframes to obtain CQI quantized values $CQI_{F1\_2}$ and $CQI_{F2\_2}$.

Step S12-2: in the second frame, the BS schedules the UE to report CQI information. The UE reports the latest measurement result of the sixth static downlink subframe $CQI_{S\_2}$ and the latest measurement results of two dynamic downlink subframes $CQI_{F1\_2}$ and $CQI_{F2\_2}$ (in the reporting manner described in Step S12-2, only the CQI value of the latest measurement, that is, the CQI value measured in the second frame is reported; in fact, it can be understood as below: the weight factor for the CQI value measured in the second frame is 1, while the weight factor for the CQI value measured in the first frame is 0; therefore, the actual reporting result is the same as the measurement result for the second frame).

Step S12-3; through measurements for the first two frames, the UE obtains $CQI_S$, $CQI_{F1}$ and $CQI_{F2}$ using Equation (1). If $CQI_{F1}=CQI_{F2}\neq CQI_S$, downlink subframes 0, 1, 4, 5, 6 and 9 can be grouped into a subframe set 1 of equal channel quality, and downlink subframes 7 and 8 into a subframe set 2 of equal channel quality.

Step S13: in the followed 14 frames, the UE measures and reports CQI values based on the acquired grouping result of subframe sets of equal channel quality. Specifically, Step S13-1: when measuring the downlink channel condition, the UE selects one subframe for CQI measurement from all the subframes of the subframe set 1 (or 2) of equal channel quality, and regards the measurement result as the CQI value for that subframe set of equal channel quality for this measurement. Several measurement results of the subframe among the 14 frames for CQI measurement may be the same or different. Step S13-2: when reporting CQI information to the BS, the UE only needs to report one CQI value for the subframe set 1 (or 2) of equal channel quality. Step S13-3: among the 14 frames, the UE needs to inform the BS of the current cell of the correspondence relation between the CQI information and the subframes in at least the first reporting the CQI information.

Steps S12 and S13 may be operated twice in one reconfiguring period.

In addition to the embodiment of grouping downlink subframes into subframe sets of equal channel quality, the solution of directly grouping downlink subframes into a group of dynamic downlink subframes and a group of static downlink subframes according to downlink and uplink subframe configurations may includes the following steps:

First, the UE acquires the dynamic and static downlink subframes, and sets all the static downlink subframes as a first subframe set (group) and all the dynamic ones as a second subframe set (group).

Then, when reporting CQI is needed, one subframe is randomly selected from the first subframe set for CQI measurement, and the measurement value is regarded as the CQI value for the first subframe set; one subframe is randomly selected from the second subframe set for CQI measurement, and the measurement value is regarded as the CQI value for the second subframe set.

Next, the CQI values for the two subframe sets and the corresponding set information are reported to the BS, which already knows the members of each subframe set, so only the IDs of the subframe sets need to be reported as set information. For example, 1-bit information may be used to represent the two subframe sets, 0 representing the first subframe set and 1 representing the second subframe set.

Further, after obtaining the above first and second subframe sets, the second subframe set may be further divided. The CQI measurement and reporting process at this time is as below:

(1) The BS performs the grouping based on the initial subframe sets of equal channel quality at the network side, and informs the grouping result to the UE.

The BS of the target cell groups the initial subframe sets of equal channel quality based on the number of neighboring interfering cells with uplink interference to the downlink subframes under the UL/DL configuration of the current cell, groups the downlink subframes of the current cell with an equal number of uplink interference cells into the same set, and groups the downlink subframes of the current cell with different numbers of uplink interference cells into different sets.

(2) The UE measures CQI based on the grouping of initial subframe sets of equal channel quality.

(2-1) When measuring the downlink channel quality, the UE may randomly select one subframe from all the subframes of the same initial subframe set of equal channel quality for CQI measurement, and regard the measurement value as the CQI value for the subframe set of equal channel quality.

(2-2) For each initial subframe set of equal channel quality, the CQI value reported by the UE may be a weighted calculating result of the current CQI measurement value and previous CQI measurement values of the subframe set of equal channel quality.

(3) Adjusting the initial subframe sets of equal channel quality and reporting CQI.

Based on the CQI values reported by the UE of the initial subframe set of equal channel quality acquired in Step (2-2), adjusting the initial subframe sets of equal channel quality and reporting CQI may adopt the following two ways:

(3-1) The UE reports one CQI value for each initial subframe set of equal channel quality. The BS combines the initial subframe sets of equal channel quality having the same or similar CQI value(s) based on received CQI values of the initial subframe sets of equal channel quality to obtain adjusted subframe sets of equal channel quality. The BS informs the grouping result of the adjusted subframe sets of equal channel quality to the UE.

(3-2) The UE compares the CQI values of the initial subframe sets of equal channel quality, and combines the initial subframe sets of equal channel quality having the same or similar CQI value(s) to obtain adjusted subframe sets of equal channel quality. The UE reports a CQI value for each adjusted subframe set of equal channel quality, and informs the BS of the correspondence relation between the CQI values and the subframe sets.

(4) The UE repeats Steps 2/3 based on the adjusted subframe sets of equal channel quality.

Embodiments of the present invention also provide a communication quality determination method for a wireless communication system.

Figure 4:
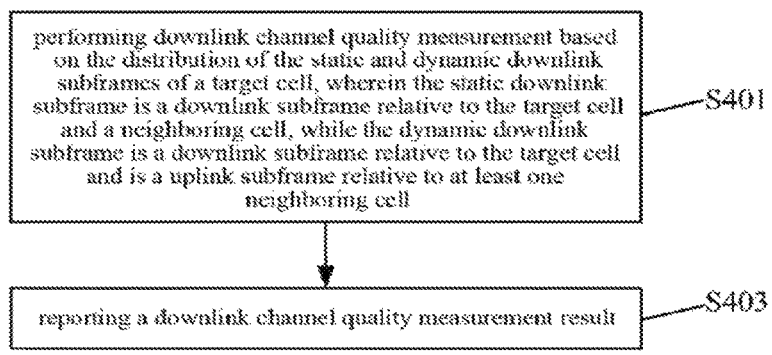
FIG. 4 is a flowchart showing a communication quality determination method for a wireless communication system according to an embodiment of this invention.

As shown in FIG. 4, the communication quality determination method for a wireless communication system according to the embodiments of the present invention comprises:

Step S401: performing downlink channel quality measurement based on the distribution of the static and dynamic downlink subframes of a target cell, wherein the static downlink subframe is a downlink subframe relative to the target cell and a neighboring cell, while the dynamic downlink subframe is a downlink subframe relative to the target cell and is a uplink subframe relative to at least one neighboring cell; and Step S402: reporting a downlink channel quality measurement result.

According to one aspect, the method further comprises: receiving static and dynamic downlink subframe information of the target cell. The method may further comprise: grouping the downlink subframes of the target cell based on the static and dynamic downlink subframe information of the target cell configured or received by the uplink/downlink subframes of the target cell and the neighboring cell, to obtain a group containing static downlink subframes and a group containing dynamic downlink subframes. The method may further comprise: further grouping the groups of dynamic downlink subframes based on the number of interference subframes of each dynamic downlink subframe, the interference subframe being an uplink interference subframe of other cells.

According to another aspect, the method further comprises: performing in advance, among a predetermined number of frames, measurement for each dynamic downlink subframe of each frame, and measurement for at least one static downlink subframe of each frame; averaging multiple measurement results of each measured subframe among the predetermined number of frames to obtain a measurement result of each measured dynamic downlink subframe and a measurement result of the static downlink subframe; and grouping the subframes whose measurement result difference falls into a predetermined range into one group.

Performing downlink channel quality measurement based on the distribution of the static and dynamic downlink subframes of a target cell comprises: measuring the downlink channel quality of at least one downlink subframe in each group to obtain a downlink channel quality measurement result of the group.

The method may further comprise: combining the groups whose measurement result difference falls into the predetermined range to obtain one or more groups.

In addition, reporting the downlink channel quality measurement results comprises: reporting the downlink channel quality measurement results of at least a part of the groups, wherein the downlink channel quality measurement result of each group is obtained from a measurement value of at least one measured subframe in the group or an averaged measurement value of several measured subframes in the group.

Alternatively, the method may further comprise: when reporting the downlink channel quality measurement results, reporting the downlink channel quality measurement results of a part of all the groups, wherein said part of the groups subject to reporting are determined based on at least one of the following conditions: the downlink channel quality, the number of downlink subframes contained and the reporting history.

In addition, when reporting the measurement result, the subframe(s) or group corresponding to the measurement result is/are also reported.

Embodiments of the present invention also provide a communication quality acquisition device for a wireless communication system.

Figure 5:
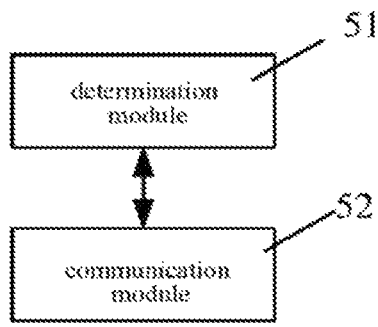
FIG. 5 is a block diagram of a communication quality acquisition device for a wireless communication system according to an embodiment of this invention.

As shown in FIG. 5, the communication quality acquisition device for a wireless communication system according to the embodiments of the present invention comprises:

a determination module 51 configured to determine the distribution of the static and dynamic downlink subframes of the downlink subframes of a target cell based on the uplink/downlink subframe configurations of the target cell and a neighboring cell; and a communication module 52 configured to transmit the distribution of static and dynamic downlink subframes to user equipment of the target cell, and to receive a downlink channel quality measurement result measured and reported by the user equipment based on the distribution of static and dynamic downlink subframes.

The communication module 52 is further configured to receive uplink/downlink subframe configuration information of the neighboring cell.

The communication module 52 is further configured to transmit or receive the reconfigured uplink/downlink subframe configuration information when the target cell or the neighboring cell reconfigures the uplink/downlink subframes, and the determination module 51 is further configured to re-determine the distribution of the static and dynamic downlink subframes of the downlink subframes of the target cell based on the reconfigured uplink/downlink subframe configuration information.

The device may further comprise: a analysis module (not shown) configured to analysize a received downlink channel quality measurement result to determine a subframe corresponding to the measurement result.

Embodiments of the present invention also provide a communication quality acquisition method for a wireless communication system.

Figure 6:
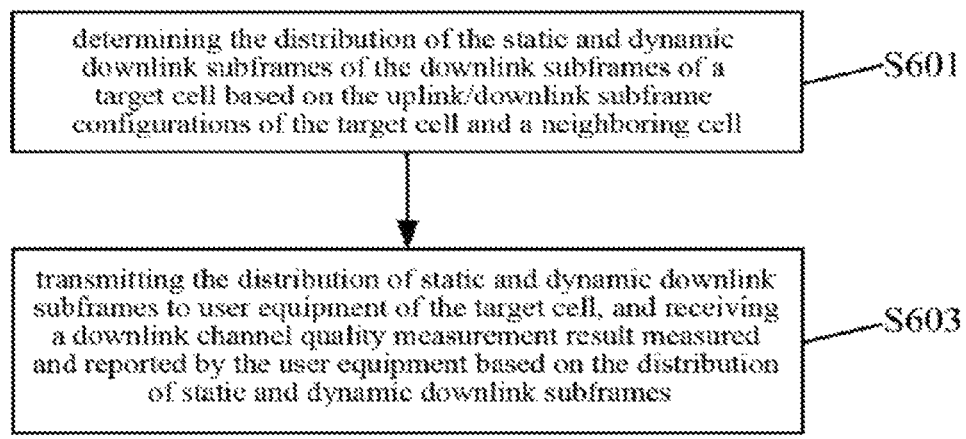
FIG. 6 is a flowchart showing a communication quality acquisition method for a wireless communication system according to an embodiment of this invention.

As shown in FIG. 6, the communication quality acquisition method for a wireless communication system according to the embodiments of the present invention comprises:

S601: determining the distribution of the static and dynamic downlink subframes of the downlink subframes of a target cell based on the uplink/downlink subframe configurations of the target cell and a neighboring cell; and S603: transmitting the distribution of static and dynamic downlink subframes to user equipment of the target cell, and receiving a downlink channel quality measurement result measured and reported by the user equipment based on the distribution of static and dynamic downlink subframes.

Embodiments of the present invention also provide a communication quality determination device for a wireless communication system.

Figure 7:
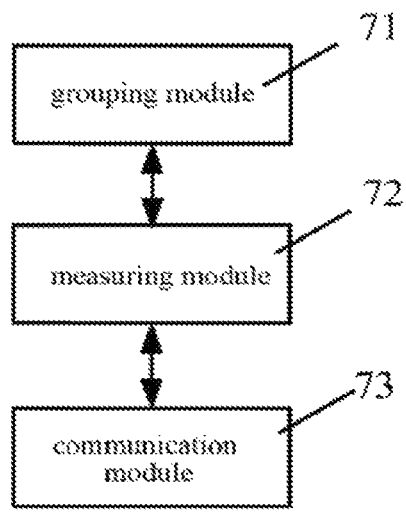
FIG. 7 is a block diagram of a communication quality determination device for a wireless communication system according to another embodiment of this invention.

As shown in FIG. 7, the communication quality determination device for a wireless communication system according to the embodiments of the present invention comprises:
- a grouping module 71 configured to group the downlink subframes of a target cell to obtain at least one downlink subframe set; and
- a measuring module 72 configured to perform downlink channel quality measurement for the different downlink subframe sets.

In one embodiment, the communication quality determination device above may further comprise:
- a communication module 73 configured to receive information about the downlink subframe set to be used by the grouping module 71, and to report a downlink channel quality measurement result to the target cell.

In addition, the communication module 73 reports downlink channel quality measurement results of the different downlink subframe sets.

In addition, the grouping module 71 groups the downlink subframes of the target cell to obtain two downlink subframe sets.

In addition, the interference to the two downlink subframe sets is different.

In addition, the grouping module 71 performs grouping based on the static and dynamic downlink subframes of the downlink subframes of the target cell to obtain the two downlink subframe sets, wherein the static downlink subframe is a downlink subframe relative to the target cell and a neighboring cell, while the dynamic downlink subframe is a downlink subframe relative to the target cell and is a uplink subframe relative to at least one neighboring cell.

In addition, the downlink channel quality measurement performed by the measuring module 72 is CQI measurement, and the communication module 73 reports a CQI measurement value to the target cell.

In addition, the communication module 73 receives the information about the downlink subframe set through RRC signaling.

Embodiments of the present invention also provide a communication quality acquisition device for a wireless communication system.

Figure 8:
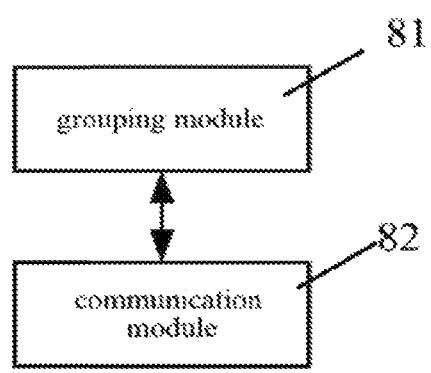
FIG. 8 is a block diagram of a communication quality acquisition device for a wireless communication system according to another embodiment of this invention.

As shown in FIG. 8, the communication quality acquisition device according to the embodiments of the present invention comprises:
- a grouping module 81 configured to group the downlink subframes of a target cell to obtain at least one downlink subframe set; and
- a communication module 82 configured to transmit information of the at least one downlink subframe set to user equipment of the target cell and receive a downlink channel quality measurement result of the different downlink subframe set from the user equipment.

The grouping module 81 groups the downlink subframes of the target cell to obtain two downlink subframe sets.

In addition, the interference to the two downlink subframe sets is different.

In addition, the grouping module 81 performs grouping based on the static and dynamic downlink subframes of the downlink subframes of the target cell to obtain the two downlink subframe sets, wherein the static downlink subframe is a downlink subframe relative to the target cell and a neighboring cell, while the dynamic downlink subframe is a downlink subframe relative to the target cell and is a uplink subframe relative to at least one neighboring cell.

In addition, the communication module 82 transmits the information about the at least one downlink subframe set to the user equipment through RRC signaling.

To sum up, with the above technical solutions of this invention, by performing measurement and reporting for the downlink subframe configurations based on the distribution of the static and dynamic downlink subframes of a target cell, the present invention can accurately measure the channel quality under dynamic TDD UL/DL configurations and report the same to the network side, avoiding the problem in the prior arts that CQI reporting cannot enable the network side to know the actual communication quality of each downlink subframe under dynamic TDD UL/DL configurations. In addition, by combining the groups and/or determining the groups subject to measurement result reporting, reporting overhead can be effectively saved.

The basic principle of this invention has been described above in combination with the specific embodiment. However, it should be noted that those skilled in the art can understand that all the methods and devices of this invention or any step or member thereof can be realized in any calculating device (including processors and storage media etc.) or a network of calculating devices in the form of hardware, firmware, software or a combination thereof after reading the description of this invention and using their basic programming skills.

Therefore, the objective of this invention can be realized by operating a program or a group of programs on any calculating device. The calculating device is a common used device known. Therefore, the objective of this invention can be realized by providing program products containing program codes for realizing the method or device. That is, such program products and storage media storing such program products also form this invention. Obviously, the storage media can be any known storage media or any storage media developed in the future.

Another embodiment of this invention provides a storage medium (which may be a ROM, a RAM, a hard disc, a detachable memory or the like) embedded with a computer program for performing downlink channel quality measurement, the computer software being configured to execute the code segments of the following steps: performing downlink channel quality measurement based on the distribution of the static and dynamic downlink subframes of a target cell, wherein the static downlink subframe is a downlink subframe relative to the target cell and a neighboring cell, while the dynamic downlink subframe is a downlink subframe relative to the target cell and is a uplink subframe relative to at least one neighboring cell; and reporting a downlink channel quality measurement result.

Another embodiment of this invention provides a computer software configured to execute the code segments of the following steps: performing downlink channel quality measurement based on the distribution of the static and dynamic downlink subframes of a target cell, wherein the static downlink subframe is a downlink subframe relative to the target cell and a neighboring cell, while the dynamic downlink subframe is a downlink subframe relative to the target cell and is a uplink subframe relative to at least one neighboring cell; and reporting a downlink channel quality measurement result.

Another embodiment of this invention further provides a device including a processor, the processor being configured to execute the following steps: performing downlink channel quality measurement based on the distribution of the static and dynamic downlink subframes of a target cell, wherein the static downlink subframe is a downlink subframe relative to the target cell and a neighboring cell, while the dynamic downlink subframe is a downlink subframe relative to the target cell and is a uplink subframe relative to at least one neighboring cell; and reporting a downlink channel quality measurement result.

Another embodiment of this invention further provides a computer program configured to execute the code segments of the following steps: grouping the downlink subframes of the target cell to obtain at least one downlink subframe set; and performing downlink channel quality measurement to different downlink subframe sets.

Another embodiment of this invention provides a device including a processor, the processor being configured to execute the following steps: grouping the downlink subframes of the target cell to obtain at least one downlink subframe set; and performing downlink channel quality measurement to different downlink subframe sets.

Another embodiment of this invention further provides a computer program configured to execute the code segments of the following steps: grouping the downlink subframes of the target cell to obtain at least one downlink subframe set; and transmitting information of the at least one downlink subframe set to user equipment of the target cell, and receiving a downlink channel quality measurement result of different downlink subframe set from the user equipment.

Another embodiment of this invention further provides a device including a processor, the processor being configured to execute the following steps: grouping the downlink subframes of the target cell to obtain at least one downlink subframe set; and transmitting information of the at least one downlink subframe set to user equipment of the target cell, and receiving a downlink channel quality measurement result of different downlink subframe set from the user equipment.

Figure 9:
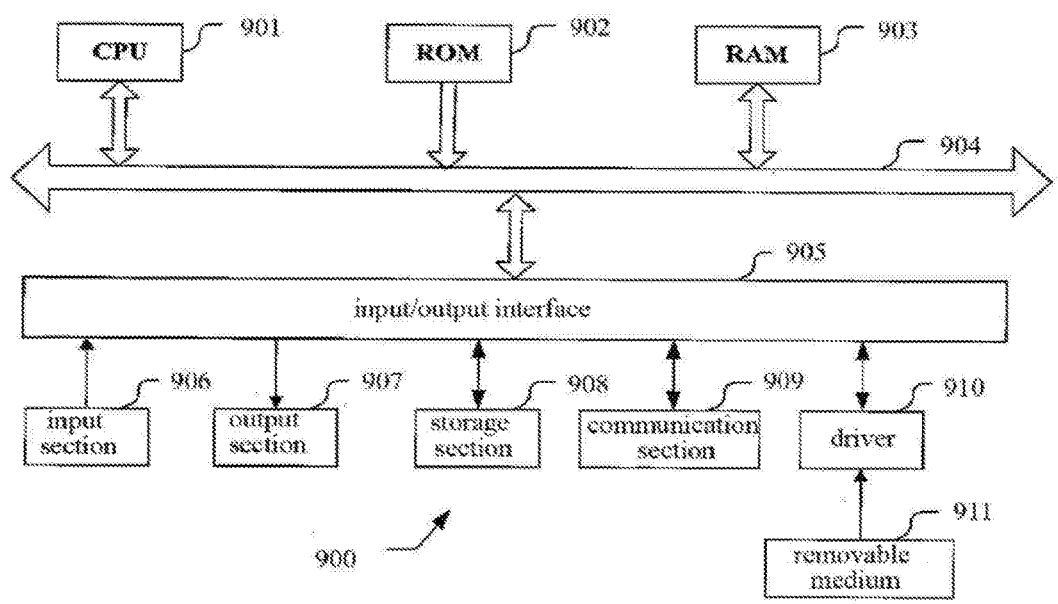
FIG. 9 is an exemplary block diagram of a computer implementing a technical solution of this invention.

In an embodiment where this invention is realized by a software and/or a firmware, a program forming the software may be installed to a computer having a dedicated hardware structure from a storage medium or a network, for example, a general computer 900 shown in FIG. 9, When the computer is installed with various programs, various functions can be performed.

In FIG. 9, a central processing unit (CPU) 901 performs various processing according to a program stored in a read-only memory (ROM) 902 or a program loaded from a storage section 908 to a random access memory (RAM) 903. Data required for performing various processing by the CPU 901 may be stored In the RAM 903 if necessary. The CPU 901, ROM 902 and RAM 903 are connected with each other by a bus 904. The input/output interface 905 is also connected to the bus 904.

The following members are also connected to the input/output interface 905: an input section 906 including a keyboard and a mouse etc.; an output section 907 including a display, such as a cathode ray tube (CRT) and a liquid crystal display (LCD), and a loudspeaker etc.; a storage section 908 including a hard disc etc.; and a communication section 909 including a network interface card, such as an LAN card and a modem etc. The communication section 909 performs communication processing via a network such as the Internet.

A driver 910 may also be connected to the input/output interface 905 if necessary. A detachable medium 911, such as a magnetic disc, a compact disc, a magnetic-optical disc and a semiconductor storage etc. may be installed to the driver 910 if necessary, so that computer program read therefrom may be installed to the storage section 908.

When the above processing is realized by software, a program forming the software may be installed from a network, such as the Internet, or a storage medium, such as the detachable medium 911.

Those skilled in the art should understand that such storage media are not limited to the detachable medium 911 shown in FIG. 9 that is stores a program and can transmit a program to a user detachably from a device. Examples of the detachable medium 911 include magnetic discs (including Floppy Disc (a registered trademark)), compact discs (including compact disc ROMs (CD-ROMs) and digital versatile discs (DVDs)), magnetic-optical discs (including mini discs (MD) (a registered trademark)), and semiconductor storages. Or the storage medium may be the ROM 902 or a hard disc included in the storage section 908 which includes a program and is distributed to a user together with a device containing the same.

It should be noted that the members or steps of the device and method of this invention can be disassemble and/or recombined. Such disassembling and/or recombination should be regarded as equivalent solutions of this invention. In addition, the steps of the above processing may be performed chronologically according to the order of description, yet the chronological sequence may not be necessary. Some steps may be performed in parallel or independently.

Although the present invention and its advantages are exhaustively described, it should be understood that modifications, substitutions and replacements may be made without departing from the spirit and scope defined by the appended claims of this invention. The terms "comprise", "include" or other variations of this application mean non-exclusive inclusion, so that a process, method, produce or device including a series of elements not only includes the listed elements, but also other elements not clearly specified or the elements inherently included thereby. When there is no other restriction, an element defined by the phrase "including/comprising a . . . " does not exclude other elements included in the process, method, produce or device including the specified element.

The invention claimed is:

1. A communication quality determination device for a wireless communication system, comprising:
  processing circuitry configured to:
    perform downlink channel quality measurement based on a distribution of static downlink subframes and dynamic downlink subframes of a target cell, wherein the static downlink subframes are downlink subframes relative to the target cell and at least one neighboring cell, the dynamic downlink subframes are downlink subframes relative to the target cell and are uplink subframes relative to the at least one neighboring cell,
    perform, among a plurality of frames, channel quality measurement for each of the dynamic downlink subframes of each of the plurality of frames, and channel quality measurement for at least one of the static downlink subframes of each of the plurality of frames,
    average multiple measurement results of the plurality of frames to obtain a measurement result of the each of the dynamic downlink subframes measured and a measurement result of the at least one of the static downlink subframes,
    group subframes including the dynamic downlink subframes and the at least one of the static downlink subframes measured whose measurement result difference falls into a predetermined range into one group, and
report a downlink channel quality measurement result to the target cell.

2. The communication quality determination device according to claim 1, wherein the processing circuitry is further configured to receive static and dynamic downlink subframe information of the target cell.

3. The communication quality determination device according to claim 1, wherein the processing circuitry is further configured to group the downlink subframes of the target cell based on static and dynamic downlink subframe information of the target cell configured or received by uplink/downlink subframes of the target cell and the at least one neighboring cell, to obtain groups including a first group containing the static downlink subframes and a second group containing the dynamic downlink subframes.

4. The communication quality determination device according to claim 3, wherein the processing circuitry is further configured to group the second group containing dynamic downlink subframes based on a number of interference subframes of each of the dynamic downlink subframes, wherein the interference subframes are uplink interference subframes of other cells.

5. The communication quality determination device according to claim 3, wherein the processing circuitry is further configured to perform downlink channel quality measurement of at least one of downlink subframes in each of the groups, to obtain downlink channel quality measurement results of the groups.

6. The communication quality determination device according to claim 5, wherein the processing circuitry is further configured to combine the groups whose measurement result difference falls into predetermined ranges to obtain one or more groups.

7. The communication quality determination device according to claim 3, wherein the processing circuitry is further configured to report a downlink channel quality measurement result of at least a part of the groups, wherein a downlink channel quality measurement result of each group is obtained from a measurement value of at least one measured subframe in the group or an averaged measurement value of plural measured subframes in the group.

8. The communication quality determination device according to claim 3, wherein the processing circuitry is further configured to report a downlink channel quality measurement result of all the groups or parts of all the groups, wherein the part of all the groups subject to reporting are determined based on at least one of (i) downlink channel quality, (ii) a number of downlink subframes contained, and (iii) reporting history.

9. The communication quality determination device according to claim 3, wherein when reporting the measurement result, one of downlink subframes or group corresponding to the measurement result is also reported.

10. A communication quality acquisition device for a wireless communication system, comprising:
processing circuitry configured to:
determine a distribution of static and dynamic downlink subframes of downlink subframes of a target cell based on uplink/downlink subframe configurations of the target cell and at least one neighboring cell,
transmit the distribution of the static and dynamic downlink subframes to user equipment of the target cell, and
receive a downlink channel quality measurement result measured and reported by the user equipment based on the distribution of the static and dynamic downlink subframes, wherein the user equipment (i) averages multiple measurement results of a plurality of frames to obtain a measurement result of each of the dynamic downlink subframes measured and a measurement result of the at least one of static downlink subframes and (ii) groups subframes including the dynamic downlink subframes and the at least one of the static downlink subframes measured whose measurement result difference falls into a predetermined range into one group.

11. The communication quality acquisition device according to claim 10, wherein the processing circuitry is further configured to receive uplink/downlink subframe configuration information of the at least one neighboring cell.

12. The communication quality acquisition device according to claim 10, wherein the processing circuitry is further configured to transmit or receive a reconfigured uplink/downlink subframe configuration information when the target cell or the at least one neighboring cell reconfigures uplink/downlink subframes, and the processing circuitry is further configured to re-determine the distribution of the static and dynamic downlink subframes of the downlink subframes of the target cell based on the reconfigured uplink/downlink subframe configuration information.

13. The communication quality acquisition device according to claim 10, wherein the processing circuitry is further configured to analyze a received downlink channel quality measurement result to determine a downlink subframe corresponding to the measurement result.

14. A communication quality determination device for a wireless communication system, comprising:
processing circuitry configured to:
group downlink subframes of a target cell to obtain at least one of downlink subframe sets based on a predetermined subframe distribution;
perform, among a plurality of frames, channel quality measurement for each of dynamic downlink subframes of each of the plurality of frames, and channel quality measurement for at least one of static downlink subframes of each of the plurality of frames;
average multiple measurement results of the plurality of frames to obtain a measurement result of each of the dynamic downlink subframes measured and a measurement result of the at least one of static downlink subframes;
group subframes including the dynamic downlink subframes and the at least one of the static downlink subframes measured whose measurement result difference falls into a predetermined range into one group; and
report a downlink channel quality measurement result to the target cell.

15. The communication quality determination device according to claim 14, wherein the processing circuitry is further configured to group the downlink subframes of the target cell to obtain two downlink subframe sets, and interference to the two downlink subframe sets is different.

16. The communication quality determination device according to claim 15, wherein the processing circuitry is further configured to perform grouping based on static and dynamic downlink subframes of the downlink subframes of the target cell to obtain the two downlink subframe sets, wherein the static downlink subframes are downlink subframes relative to the target cell and at least one neighboring cell, while the dynamic downlink subframe are downlink subframes relative to the target cell and are uplink subframes relative to the at least one neighboring cell.

17. The communication quality determination device according to claim 14, wherein a downlink channel quality measurement is a channel quality indicator (CQI) measurement, and the processing circuitry is further configured to report a CQI measurement value to the target cell and receive information about the downlink subframe sets through radio resource control (RRC) signaling.

* * * * *